March 2, 1965
E. A. MARKS ETAL
3,172,069
PRESSURE POTENTIOMETER ARRANGEMENT
Filed April 14, 1964
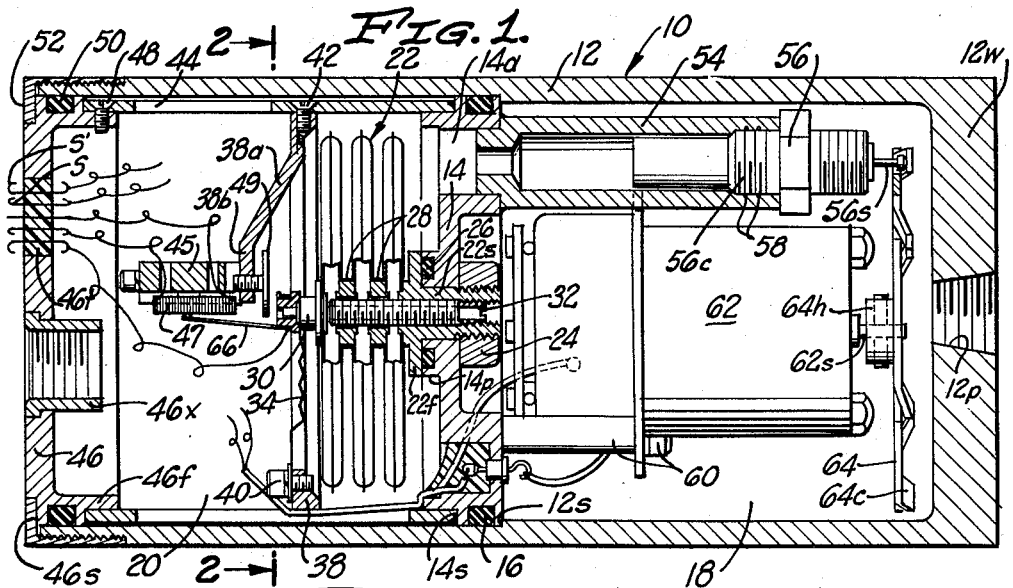
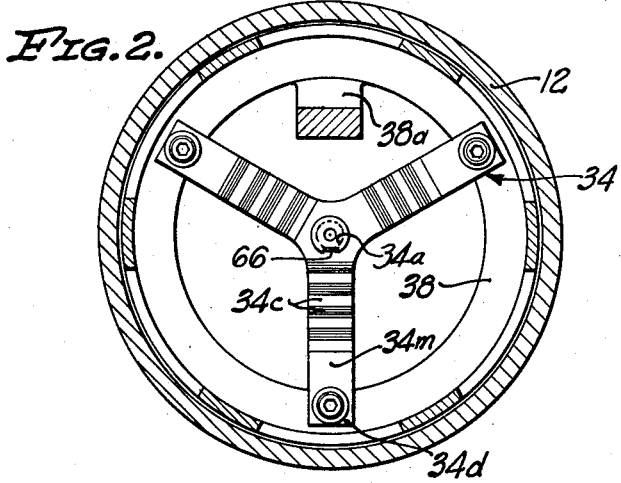
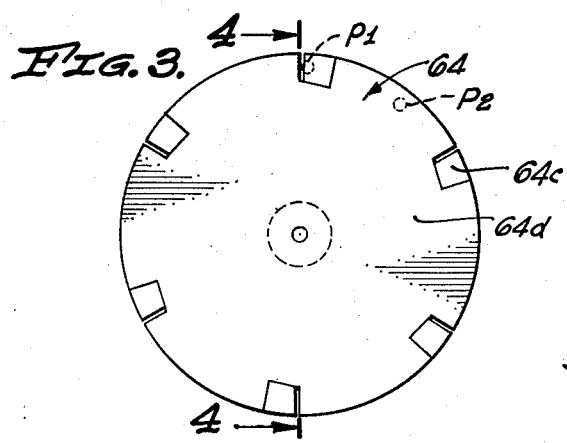
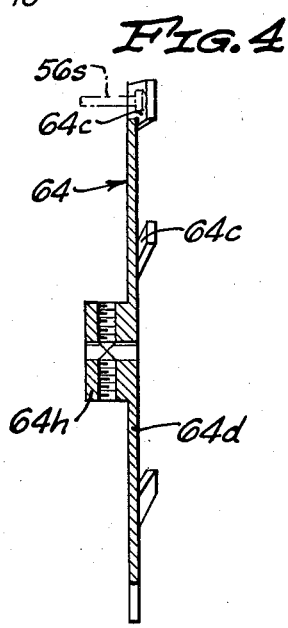
INVENTORS
EUGENE A. MARKS,
DAVID R. MOWRY,
ROGER B. SPERLING,
EARL M. WILSON
BY

3,172,069
PRESSURE POTENTIOMETER ARRANGEMENT
Eugene A. Marks, David R. Mowry, Roger B. Sperling, and Earl M. Wilson, all of Riverside, Calif., assignors to Bourns, Inc., a corporation
Filed Apr. 14, 1964, Ser. No. 359,755
6 Claims. (Cl. 338—41)

The invention hereinafter disclosed pertains to a pressure potentiometer arrangement capable of producing changes of electrical resistance, or, equivalently, changes of electric potential, commensurate with deviations above or below a preselected value of ambient pressure, and having easy capability of being remotely re-set to produce such changes or indications relative to the ambient pressure at whatever location the arrangement is momentarily situated.

In some applications of pressure potentiometers of the type capable of indicating deviation of the ambient or environmental pressure relative to some determined pressure (e.g., sea level), it may be desirable to not only be permitted to set the transducer to a particular reference pressure, but to be able to readily do so while the instrument is remote from an operator. A typical example that may be cited is a pressure potentiometer that is mounted in a remotely controlled unoccupied aerial vehicle and is arranged to produce controlling signals indicating change of ambient pressure (altitude of the vehicle) above and below a prescribed value that represents the altitude at which it is desired that the vehicle be maintained. In that exemplary situation, the controlling signals produced by the potentiometer are utilized in apparatus connected thereto and connected to control means governing the flight of the vehicle, whereby upon tendency for the vehicle to increase altitude the control means are operated to counteract the tendency, and similarly in the case of the tendency for the vehicle to decrease its altitude. While "altitude-hold" transducers, and the associated controls-arrangements for causing the aerial vehicle to attain and more-or-less constantly maintain a pre-selected altitude as represented by a particular barometric-pressure value have previously been known, such devices were set for the desired value while the vehicle was on the ground. Not only is it at times desirable to be able to have the vehicle make radical but controlled changes in altitude during a flight, but it also is desirable at times to be able to effect small adjustments of the previously selected altitude or reference pressure-value.

Further, in prior-art arrangements for the purpose indicated, the attained degree of accuracy was very poor, especially under very low pressure conditions. Low accuracy was in considerable measure due to excessive friction between relatively movable parts, such as friction between the wiper contact and the resistance element.

The present invention provides an arrangement permitting the noted changes in reference pressure to be easily effected while the vehicle is in flight and remote from the monitoring operator under whose general control or supervision the vehicle is operated. These results the invention accomplishes by providing means whereby the pressures on the inside and outside of the pressure-sensitive cell of the pressure potentiometer may be equalized at any time during flight of the vehicle, using signals that may be transmitted over any signal channel such as one in the telemetry system linking the vehicle with the vehicle-monitoring station. Thus the potentiometer of the pressure potentiometer part of the arrangement is preferably so arranged that the brush or wiper contact is at midpoint along the contact zone of the resistance element whenever the exterior and interior pressures at the pressure-sensitive cell are equal; and means are provided whereby upon receipt of a signal, the fluids in the interior and about the exterior of the cell are permitted to come to the pressure of the ambient fluid, either by way of inflow of fluid, or exhaust of fluid. More specifically, the fluid around the exterior of the cell or capsule is made to come to the pressure of the ambient fluid by way of a valve that is interposed in a passage communicating with a chamber in which the cell is disposed. The valve automatically assumes one state (open, or closed), and means are provided that are responsive to a received signal to first initiate or cause opening of the valve and shortly thereafter to initiate or cause closing of the valve. Preferably the valve is of the type that is self-closing and normally closed and is forced to the open position by the signal-responsive means and later is permitted to close, whereby in response to the signal a new reference pressure equal to the ambient pressure, is established. The signal is thus preferably divided into two time-separated portions, and, as will later be explained, the signal in the case of the preferred embodiment of the invention consists of two time-spaced electric pulses, each of which may be termed a signal and the separation of which may be either governed remotely or may be controlled at the site of the instrument by conventional means such as a time-delay relay or by switching means, or the like. Additionally, the arrangement according to the invention provides means whereby friction effects and evolution of heat are considerably reduced, so that the accuracy attained is much improved. Especially in environments of very low pressure, where heat-dissipation is a problem, accuracy is improved by reduction in heating effects.

The preceding brief general description of the invention indicates that it is a principal object of the invention to provide improvements in a pressure potentiometer arrangement.

An additional object of the invention is to provide a pressure-transducer system that is capable of providing an arbitrarily-selected reference pressure, with means for remotely selecting the reference pressure.

Another object of the invention is to provide a pressure-potentiometer system having a sensor cell sensitive to differences in the pressure inside the cell and outside the cell, and remotely operable valve means connected to the cell and permitting equalization of the inside and outside pressures.

Another object of the invention is to provide means for remotely establishing a reference pressure in a pressure potentiometer arrangement, with minimum expenditure of heat-producing energy.

Other objects and advantages of the invention will hereinafter be set out in the appended claims or made evident in the following detailed description of a preferred exemplary physical embodiment of the invention as illustrated in the accompanying drawings forming part of the disclosure of the invention. In the drawings:

FIGURE 1 is a view of instrumentalities according to the invention, shown partly in section whereby to better depict details, and illustrating an arrangement of principal components of the system;

FIGURE 2 is a transverse sectional view, taken as indicated by broken line on FIGURE 1;

FIGURE 3 is a face view of a valve-actuator member shown in FIGURE 1; and

FIGURE 4 is a sectional view, taken as indicated by broken line 4—4 of FIGURE 3.

Referring now to the drawings and to FIGURE 1 in particular, the movable parts of the exemplary pressure potentiometer arrangement 10 are housed in a cylindrical case, 12, that is closed by an end wall 12w at one end and at the other end by means presently described. Case 12 is provided with an inlet port 12p that is conveniently disposed in end wall 12w as shown, whereby fluid under pressure may be admitted. The case is provided with an internal peripheral step 12s upon which is mounted a closely-fitting support 14 in the form of a shaped plate which, with aid from an encircling O-ring 16, divides the interior of the case into first and second chambers 18 and 20. Mounted in a centrally-disposed throughbore formed in support 14 is the tubular stem 22s of a pressure-sensitive cell 22. One end of stem 22s is exteriorly threaded and receives a nut 24. The other end of the stem is formed with an annular flange 22f that is drawn into tight contact with a complementary annular pedestal 14p formed on support 14, as shown. The pedestal 14p is provided with an annular O-ring groove, in which groove an O-ring 26 is seated, whereby the throughbore is sealed against passage of fluid except through the interior of the stem 22s.

The pressure-sensitive cell comprises a plurality (three, as shown) of interconnected expansible capsules similar to aneroid cells, one of which is welded to stem 22s so as to communicate with chamber 18. The several capsules are sealed to interconnecting rings 28, and the terminal capsule distant from stem 22s is sealed to and provided with a central button 30. Thus the interior of cell 22 is sealed from the ambient in chamber 20. Mounted in the threaded bore of stem 22s is an exteriorly-threaded stop tube 32 that extends through the rings 28 with adequate clearance to permit free expansion and contraction of cell 22 without contact between the rings and stop 32. As is made evident in FIGURE 1, stop 32 forms an adjustable member that is effective to limit contraction of cell 22 to a pre-selected extent, by virtue of contact between the stop and button 30 incident to continuing contraction of the cell as the pressure in chamber 20 becomes increasingly greater than that in chamber 18.

The "free" end of cell 22, represented by button 30, while being permitted to partake of limited axial movements incident to expansion and contraction of the cell, is held against transverse movements by a stabilizer 34 (FIGURE 2) formed of resilient spring material. The stabilizer is formed as indicated with a central aperture 34a that fits tightly on a stud-like extension of button 30; and a flat portion that is welded to the button 30 around the aperture. The stabilizer has three divergent preferably equally-spaced limbs such as 34m each having a corrugated portion such as 34c and an outer perforated end such as 34d that is adapted to be secured to a plate 38 (FIGURE 1) as by means of screws such as 40. Plate 38 is of generally ring-like conformation with an inwardly-extending arm presently to be explained, and the plate is provided at spaced locations around its periphery with radial tapped holes for reception of mounting screws such as 42 (FIGURE 1) that extend through suitably spaced apertures in a perforated cylinder 44 presently to be explained and described. Plate 38 has an inwardly extending arm 38a (FIGURE 1) that comprises a stand 38b on which is secured a slide 45 carrying an elongate resistance element 47.

Cylinder 44 (FIGURE 1) rests at its base on an annular ledge or shelf 14s formed on support 14, and is there welded to the support. The cylinder also fits at its other end on a cylindrical flange 46f of a casing cap 46, the casing cap having an annular ledge or shoulder as indicated against which the end of cylinder 44 abuts. The cylinder 44 is affixed to the casing cap 46, as by a series of screws such as screw 48. The periphery of end cap 46 fits closely in the open end of case 12, where the juncture of the two is sealed by means of an O-ring 50. Cap 50 is held in place and compressively holds cylinder 44 against step 14s, by means of a flanged retainer ring 52 that engages the threaded exterior end portion of case 12 and that is turned up tightly against a complementary annular step 46s formed on the outer face of cap 46 as indicated. End cap 46 is provided with a sealed insulative lead-through fitting 46t through which sealed insulated conductors extend, as indicated. The conductors include terminal leads connected, respectively, to the ends of the resistance element 47, to a potentiometer wiper contact, and to a stepping motor presently to be described. Also, cap 46 has welded therein a pressure fitting 46x through which fluid under pressure may be admitted, under any desired control, to chamber 20.

Sealed in an aperture 14a in the centrally-disposed support 14 (FIGURE 1) is the open end of a valve tube 54 the other end of which is internally threaded and closed by a normally-closed valve 56. The valve 56, in the interest of practicality and economy, may be of the type commonly employed in pneumatic tires; and the threaded valve casing 56c is adhesively sealed in a complementary threaded bore of tube 54, as indicated at 58. The valve comprises a valve stem 56s that may be pressed inwardly to open a passage through the valve; and thus fluid under pressure may be admitted to chamber 20 from chamber 18, or vice versa, and the pressures therein brought to equality.

Mounted on centrally-disposed support 14 in chamber 18, as by stand-off tubes and screws such as 60, is a rotary stepping motor 62 of the type marketed under the trade name LEDEX and effective to rotate the shaft thereof one step each time the electromagnet of the motor is energized. While any of a number of types or makes of stepping motors may be employed, the motor 62 of the exemplary arrangement is such as to progress through twelve substantially equal steps in performing one complete revolution of the output shaft 62s. Affixed to the shaft 62s of motor 62 is a valve-operator in the form of a cam device 64 (FIGURES 1, 3 and 4). The cam device is a disc-like structure including a bored hub 64h affixed to the shaft 62s by means of set screws 64h (FIGURE 1) and including a plate welded to the hub and, essentially, provided with a set of inclined cam surfaces such as 64c. The cam surfaces may in the interest of economy be formed by a combined shearing and bending operation performed on the sheet material of the disc 64d of the cam device. The several cam surfaces or cams are equally spaced about the periphery of the disc, as is indicated in FIGURE 3; and are so dimensioned and formed that as the motor 62 steps through a valve-cycle of two steps, one of the cam surfaces in rotating during a first step collides or comes into contact with the head of valve stem 56s and forces the stem into the valve to thus open the valve. During that step the cam surface drives inwardly the valve stem and the head of the stem is left pressing against a flat face of the disc, as at P2 (FIGURE 3). At the next step of motor 62 the cam device is again rotated approximately 30°, and during that step of rotation the head of the valve stem drops off the sheared radial edge of the disc adjacent the next cam, and moves outwardly away from the valve toward but not into contact with, the cam surface. Thus the full cycle of valve operations requires two steps of motor 62.

As previously indicated, electric signal pulses are supplied to the stepping motor via conductors from terminals including terminals S and S', the conductors being broken for convenience in illustration. Fluid pressures exhibited in chambers 18 and 20 may be controlled by means connected to fitting 46x and to port 12p; and either may be a reference pressure. In one exemplary operation of the arrangement, passage of fluid through fitting 46x is prohibited, as by a plug in the fitting or by operation of an external valve, and port 12p is connected to the ambient atmosphere. At a particular attained altitude a signal pulse is transmitted via terminals connected to motor 62, and the motor steps and advances the disc and a cam 64c to open valve 56, whereupon the pressures in chambers 18 and 20 become equalized and the wiper of the potentiometer is moved to mid-position. Thereafter the second pulse of the signal again steps the motor, permitting outward movement of stem 56s and closure of valve 56. The potentiometer wiper 66 (FIGURE 1) may be of a variety of constructions but as depicted comprises a resilient arm having at one end a pellet of precious metal in contact with the resistance element 47 and at its other end secured to but insulated from, button 30. Thus as the pressure-sensitive cell 22 expands and contracts, the pellet of wiper 66 is driven along an extent of the element and causes a change in the resistance (or potential) exhibited between either terminal lead of the element and that connected to the wiper. The change of resistance thus produced as the pellet moves from mid-position is employed by means not a part of the present invention, to initiate change of altitude of the vehicle in a direction to return the ambient pressure to equality with that in chamber 20. Expansion of cell 22 is limited by an adjustable stop means, such as stop screw 49.

The preceding description of a preferred exemplary pressure potentiometer arrangement makes it evident that the aforestated objects of the invention have been attained. In the light of the detailed disclosure of a preferred exemplary embodiment of the invention, changes and modifications within the spirit and scope of the invention will occur to others. Accordingly it is not desired to restrict the invention to the exact details of the exemplary device, except as may be required by the appended claims.

We claim:

1. A pressure potentiometer arrangement for producing electrical indications of change of ambient pressure to above or below a selectable reference pressure equal to the ambient pressure at a remote locality at a determinable time, said arrangement comprising:

first means, including means providing first and second sealed chambers and a separating means including an elastic fluid-tight pressure-sensitive cell separating said chambers each from the other and the interior of said cell communicating with one of said chambers and the exterior of said cell communicating with the other of said chambers, and means providing access of the ambient fluid into one of said chambers whereby to bring the pressure in that one of said chambers to ambient pressure, and one portion of said cell being fixed and stationary relative to other of said first means and a second portion of said cell being free to move along a line of movement incident to expansion and contraction of the cell;

second means, including potentiometer connections and first and second potentiometer components comprising a resistance element and a wiper contact, a first of said potentiometer components being affixed to said second portion of said cell to move therewith along a linear path, and the second of said potentiometer components being affixed to said first means to remain stationary therewith, said resistance element having a linear exposed contact zone along said linear path and in contact with said wiper contact, whereby incident to expansion and contraction of said cell the resistance exhibited between either end of said element and said contact is varied;

third means, including a valve communicating with said first and second chambers and operable to open and close a passage therebetween; and fourth means, including stepping-motor and cam means responsive to received electric pulse signals to operate said valve to alternately open and close said valve, whereby by appropriate remotely initiated signals to said motor the pressures in said first and second chambers may be equalized.

2. A pressure potentiometer arrangement comprising:

first means, including sealed enclosure means, forming first and second fluid-tight chambers separated by a fluid-tight separator, said first means including an elastic fluid-tight cell means having a fixed portion fixed in position in one of said chambers and a movable portion moved along a line of movement incident to expansion and contraction of the cell means caused by change in the pressure differential between the interior and the exterior of the cell means, said cell means having the interior thereof in communication with a first of said chambers and the exterior thereof in communication with the second of said chambers, one of said chambers being in communication with the ambient fluid;

second means, comprising potentiometer means including first and second components comprising a resistance element means and a wiper contact means with a contact in wiping contact with said resistance element means, and one of said components being secured to said movable portion of said cell to move directly therewith and the second of said components being affixed to said first means and positioned for cooperative action with said first component, said second means including terminal connections to respective ones of said components accessible externally of said chambers;

third means, including actuatable valve means having an operable part, said third means providing a passage communicating with said first and second chambers and opened and closed by said actuatable valve means; and fourth means, including an electric stepping motor, disposed and arranged to operate said operable valve part in response to received electric signals, said fourth means including conductor means to said motor for transmission of signals thereto; whereby incident to reception of a first signal said fourth means actuates said valve means to open said passage whereby the pressures in said chambers become equal and incident to reception of a second signal said fourth means permits return of said operable part to close said passage so that thereafter differences in pressures exhibited inside and outside said cell are indicated by corresponding changes in resistance exhibited between terminal connections of said second means.

3. A pressure potentiometer arrangement according to claim 2, said elastic cell comprising a plurality of serially interconnected aneroid cells and means to space apart said cells, and said first means comprising resilient stabilizer means connected to the said movable portion of said cell to restrict the movable portion to movements substantially along a straight line.

4. A pressure potentiometer arrangement according to claim 2, said fourth means including a cam rotated by said motor and said operable part of said valve means being a reciprocable stem alternately engaged and disengaged by said cam incident to successive stepping of said motor.

5. A pressure potentiometer arrangement adapted to provide signals representative of deviations above or below a selectable reference pressure and adapted to determine a reference pressure equal to the ambient fluid pressure at a variable remote location, said arrangement comprising:

first means, including generally-cylindrical housing means, providing first and second fluid-tight chambers separated by a fluid-tight septum in the form of a chamber-dividing support and means for admitting ambient fluid into the first of said chambers;

second means, including elastic cell means supported on said septum in said second chamber and having the interior thereof in communication with said first chamber and having a movable portion moved along a line of movement in response to expansion and contraction of said cell incident to changes in the pressure difference between said chambers;

third means, including a potentiometer connected to and adjusted by movements of said movable portion of said cell;

fourth means, including a valve mounted on said septum and providing a passage communicating at its ends with respective ones of said first and second chambers and having means including an operable valve stem for opening and closing said passage; and fifth means, including electric motor means, adapted to receive electric signals from a monitoring location and operable in response thereto to successively operate said valve stem to open said passage for equalization of the pressures in said first and second chambers to provide a reference pressure in said second chamber and to thereafter close said passage at a remote location whereby to cause said potentiometer to provide electrical signals representing deviations of the ambient pressure from said reference pressure.

6. A pressure potentiometer arrangement according to claim 5, said electric motor means comprising a stepping motor operable by electric-pulse signals whereby heating of components of said arrangement is minimized to reduce error in very low-pressure ambient fluids, and said fifth means comprising cam means operable by said motor for operating said valve stem.

References Cited by the Examiner
UNITED STATES PATENTS

| | | | |
|---|---|---|---|
| 2,713,266 | 7/55 | Smith et al. | 73—386 |
| 3,032,732 | 5/62 | Zuehlke et al. | 338—41 |

RICHARD M. WOOD, *Primary Examiner.*